(12) United States Patent
Sha et al.

(10) Patent No.: US 12,276,303 B2
(45) Date of Patent: Apr. 15, 2025

(54) MAGNETIC SUSPENSION BEARING, MAGNETIC SUSPENSION BEARING CONTROL SYSTEM AND CONTROL METHOD

(71) Applicant: TIANJIN EMAGING TECHNOLOGY CO., LTD., Tianjin (CN)

(72) Inventors: Honglei Sha, Tianjin (CN); Shenping Hong, Tianjin (CN); Tianye Yu, Tianjin (CN); Cunyu Yi, Tianjin (CN); Wanhu Liu, Tianjin (CN); Kai Li, Tianjin (CN); Jingchao Han, Tianjin (CN)

(73) Assignee: TIANJIN EMAGING TECHNOLOGY CO., LTD., Tianjin (CN)

(*) Notice: Subject to any disclaimer, the term of this patent is extended or adjusted under 35 U.S.C. 154(b) by 449 days.

(21) Appl. No.: 17/636,304

(22) PCT Filed: Mar. 10, 2021

(86) PCT No.: PCT/CN2021/080057
§ 371 (c)(1),
(2) Date: Feb. 17, 2022

(87) PCT Pub. No.: WO2022/126872
PCT Pub. Date: Jun. 23, 2022

(65) Prior Publication Data
US 2022/0397155 A1 Dec. 15, 2022

(30) Foreign Application Priority Data
Dec. 18, 2020 (CN) .......................... 202011498884.X

(51) Int. Cl.
*H01H 47/00* (2006.01)
*F16C 32/04* (2006.01)

(52) U.S. Cl.
CPC ................. *F16C 32/0455* (2013.01)

(58) Field of Classification Search
CPC ................................... F16C 32/0455
(Continued)

(56) References Cited

U.S. PATENT DOCUMENTS 5,387,851 A * 2/1995 Nuscheler ............... F16F 15/03
318/587
5,844,339 A 12/1998 Schroeder et al.
(Continued)

FOREIGN PATENT DOCUMENTS

CN 1812261 A 6/1931
CN 1599239 A 3/2005
(Continued)

OTHER PUBLICATIONS

1st Chinese Office Action.
(Continued)

*Primary Examiner* — Jared Fureman
*Assistant Examiner* — Lucy M Thomas
(74) *Attorney, Agent, or Firm* — BROOKS KUSHMAN P.C.

(57) ABSTRACT

A magnetic suspension bearing, a magnetic suspension bearing control system and a control method, the magnetic suspension bearing control system includes a processor, a synchronous signal generation module, a displacement signal conversion circuit, a post-processing circuit, an Analog-to-Digital conversion module, a pulse width modulation module, a frequency division circuit, a synchronization module, and a power amplifier. The magnetic suspension bearing includes the magnetic suspension bearing control system, a first iron core, a second iron core, a first and a second magnetic suspension bearing actuator coils wound on the first and the second iron cores respectively, and an
(Continued)

electromagnetic force suspension rotor; wherein the first and the second magnetic suspension bearing actuator coils are oppositely disposed on upper and lower sides of the electromagnetic force suspension rotor, and both the first and the second magnetic suspension bearing actuator coils are connected with the magnetic suspension bearing control system.

12 Claims, 2 Drawing Sheets

(58) Field of Classification Search
USPC .......................................................... 361/144
See application file for complete search history.

(56) References Cited

U.S. PATENT DOCUMENTS

| | | | | |
|---|---|---|---|---|
| 2003/0180997 | A1* | 9/2003 | Nakayama | H03K 17/08128 438/200 |
| 2009/0015179 | A1* | 1/2009 | Hatano | H05B 41/282 315/307 |
| 2018/0076715 | A1* | 3/2018 | Moffat | H02M 1/08 |

FOREIGN PATENT DOCUMENTS

| | | |
|---|---|---|
| CN | 101599670 A | 12/2009 |
| CN | 105823452 A | 8/2016 |
| CN | 111130541 A | 5/2020 |
| CN | 112240346 A | 1/2021 |
| CZ | 302646 B6 | 8/2011 |
| EP | 2006556 A1 | 12/2008 |
| JP | H11287248 A | 10/1999 |
| JP | 2000060169 A | 2/2000 |

OTHER PUBLICATIONS

Chinese Notice of Allowance.
International Search Report and Written Opinion.
Extended European Search Report for Application No. 201854800. 6-1009, dated Oct. 17, 2022, 11 Pages.
International Search Report and Written Opinion for Application No. PCT/CN2021/080057, dated Aug. 27, 2021, 10 Pages.
First Office Action for Chinese Application No. 202011498884.X, dated Jan. 28, 2021, 13Pages (including English machine translation).
Notice of Allowance for Chinese Application No. 202011498884.X, dated Feb. 18, 2021, 8 Pages (including English machine translation).

* cited by examiner

MAGNETIC SUSPENSION BEARING, MAGNETIC SUSPENSION BEARING CONTROL SYSTEM AND CONTROL METHOD

CROSS-REFERENCE TO RELATED APPLICATIONS

This application is the U.S. national phase of PCT Application No. PCT/CN2021/080057 filed on Mar. 10, 2021, which claims priority to Chinese Patent Application No. 202011498884.X filed on Dec. 18, 2020, both of which are hereby incorporated herein by reference in their entireties.

TECHNICAL FIELD

Embodiments of the present application relate to, but are not limited to, the field of magnetic suspension technologies, in particular to a magnetic suspension bearing, a magnetic suspension bearing control system and control method.

BACKGROUND

In some technologies, in order to make a structure of a magnetic suspension bearing compact, and to make a displacement signal and a force application position of the magnetic suspension bearing as close as possible, a displacement sensor is usually installed at a position relatively close to an electromagnet coil. An impulse current caused by a power device switch in the electromagnet coil easily interferes with a sensor signal. In order to reduce electromagnetic interference and ensure a higher signal-to-noise ratio, low-pass filtering usually needs to be performed on the sensor signal. In order to obtain less noise, a low-pass filter needs to adopt a higher order and a lower cut-off frequency, but this method introduces a larger delay and reduces dynamic performance of the magnetic suspension bearing. On the contrary, in order to obtain better dynamic performance, a low-pass filter with a lower order and a higher cut-off frequency must be adopted, while such method will reduce a signal-to-noise ratio and increase noise.

To sum up, some technologies have a technical problem that reduction of electromagnetic interference and improvement of dynamic performance of a magnetic suspension bearing cannot be achieved at the same time.

SUMMARY

The following is a summary of subject matters described in detail in herein. This summary is not intended to limit the scope of protection of the claims.

In a first aspect, an embodiment of the present application provides a magnetic suspension bearing control system, which includes a processor, a synchronous signal generation module, a displacement signal conversion circuit, a post-processing circuit, an Analog-to-Digital (A/D) conversion module, a pulse width modulation module, a frequency division circuit, a synchronization module, and a power amplifier; wherein the processor, the synchronous signal generation module, the displacement signal conversion circuit, the post-processing circuit, and the A/D conversion module are connected in a closed loop; the synchronous signal generation module, the frequency division circuit, the Pulse Width Modulation module, and the power amplifier are sequentially connected; the processor is further connected with the Pulse Width Modulation module; the pulse width modulation module, the synchronization module, and the A/D conversion module are sequentially connected; the synchronization module is further respectively connected with the synchronous signal generation module and the frequency division circuit; the synchronous signal generation module is configured to generate a reference signal and send the reference signal to the displacement signal conversion circuit and the frequency division circuit; the displacement signal conversion circuit is configured to convert the reference signal into an alternating current signal containing displacement information and send the alternating current signal containing the displacement information to the post-processing circuit; the post-processing circuit is configured to perform post-processing on the alternating current signal containing the displacement information to obtain a standard displacement signal, and send the standard displacement signal to the A/D conversion module; the frequency division circuit is configured to perform frequency division on the reference signal to generate a frequency division signal and send the frequency division signal to the pulse width modulation module and the synchronization module; the pulse width modulation module is configured to output a Pulse Width Modulation (PWM) signal to the synchronization module; the synchronization module determines delay time based on the PWM signal and send a synchronization signal based on the delay time; the A/D conversion module is configured to synchronize with the power amplifier under an action of the synchronization signal, and convert the standard displacement signal into a standard displacement digital signal and send the standard displacement digital to the processor, wherein the processor performs data processing on the standard displacement digital signal.

In an exemplary embodiment, the displacement signal conversion circuit includes a first amplification circuit and a sensor which are connected with each other, and the first amplification circuit is further connected with the synchronous signal generation module; the first amplification circuit is configured to amplify the reference signal into an excitation signal; and the sensor is driven by the excitation signal to generate the alternating current signal containing the displacement information.

In an exemplary embodiment, the sensor includes a first sensor probe and a second sensor probe; the first sensor probe and the second sensor probe are respectively disposed on upper and lower sides of an electromagnetic force suspension rotor.

In an exemplary embodiment, the post-processing circuit includes a rectification circuit, a filtering circuit, and a second amplification circuit which are sequentially connected; a connection midpoint of the first sensor probe and the second sensor probe is connected with the rectification circuit; the second amplification circuit is connected with the A/D conversion module; the rectification circuit is configured to convert the alternating current signal containing the displacement information into a half-wave displacement signal containing the displacement information under an action of a control signal; the filtering circuit is configured to perform filtering based on the half-wave signal containing the displacement information to obtain a filtered displacement signal; and the second amplification circuit is configured to adjust the filtered displacement signal to obtain the standard displacement signal.

In an exemplary embodiment, the system further includes a delay adjustment circuit disposed between the synchronous signal generation module and the rectification circuit; and the delay adjustment circuit is configured to adjust the reference signal and determine an adjusted signal as the control signal.

In an exemplary embodiment, the delay adjustment circuit includes an adjustable resistor, a capacitor, and a buffer which are connected with each other.

In an exemplary embodiment, the system further includes an inverter disposed between the pulse width modulation module and the power amplifier; and the inverter is configured to drive a device switch in the power amplifier based on the PWM signal.

In an exemplary embodiment, the sensor is an inductive displacement sensor, an eddy-current displacement sensor, or a capacitive displacement sensor.

In an exemplary embodiment, the filtering circuit is a first-order low-pass filter or a second-order low-pass filter.

In another aspect, an embodiment of the present application provides a magnetic suspension bearing, which includes the magnetic suspension bearing control system of the first aspect, a first iron core, a first magnetic suspension bearing actuator coil wound on the first iron core, a second iron core, a second magnetic suspension bearing actuator coil wound on the second iron core, and an electromagnetic force suspension rotor; wherein the first magnetic suspension bearing actuator coil and the second magnetic suspension bearing actuator coil are oppositely disposed on upper and lower sides of the electromagnetic force suspension rotor, and both the first magnetic suspension bearing actuator coil and the second magnetic suspension bearing actuator coil are connected with the magnetic suspension bearing control system.

In another aspect, an embodiment of the present application provides a magnetic suspension bearing control method, which is applied to the magnetic suspension bearing control system described in any one of the above embodiments, and includes steps S610-S640.

In step S610, a synchronous signal generation module generates a reference signal, and a displacement signal conversion circuit converts the reference signal into an alternating current signal containing displacement information, and post-processing is performed on the alternating current signal containing the displacement information to obtain a standard displacement signal.

In step S620, a frequency division circuit performs frequency division on the reference signal to generate a frequency division signal.

In step S630, a synchronization module determines an output moment based on a duty ratio of a pulse width modulation (PWM) signal output by a pulse width modulation module and correspondingly based on the frequency division signal or the PWM signal to output a synchronization signal.

In step S640, an Analog-to-Digital conversion module converts the standard displacement signal into a standard displacement digital signal according to the synchronization signal and sends the standard displacement digital signal to a processor, wherein the processor performs data processing on the standard displacement digital signal.

In an exemplary embodiment, the step of the displacement signal conversion circuit converting the reference signal into the alternating current signal containing displacement information and performing post-processing on the alternating current signal to obtain the standard displacement signal includes: a rectification circuit converts the reference signal into a half-wave signal containing the displacement information under an action of a control signal; a filtering circuit filters the half-wave signal containing the displacement information to obtain a filtered displacement signal; and a second amplification circuit adjusts the filtered displacement signal to obtain a standard displacement signal.

Other aspects will become apparent upon reading and understanding of the drawings and detailed description.

BRIEF DESCRIPTION OF DRAWINGS

Accompanying drawings are used for providing a further understanding of technical solutions of the present application, and constitute a part of the specification. They are used for explaining the technical solutions of the present application together with the embodiments of the present application, and do not constitute limitations on the technical solutions of the present application.

REFERENCE SIGNS

Figure 1:
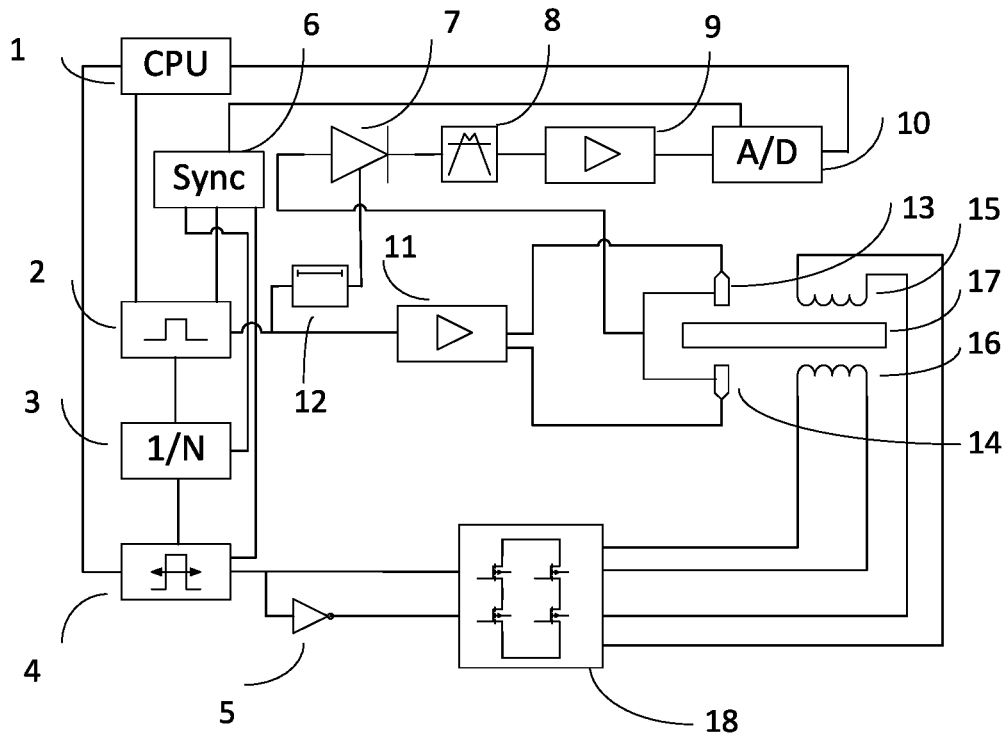
FIG. 1 is a schematic diagram of a structure of a magnetic suspension bearing control system according to an embodiment of the present application.

1—processor; 2—synchronous signal generation module; 3—frequency division circuit; 4—Pulse Width Modulation module; 5—inverter; 6—synchronization module; 7—rectification circuit; 8—filtering circuit; 9—second amplification circuit; 10—A/D conversion module; 11—first amplification circuit; 12—delay adjustment circuit; 13—first sensor probe; 14—second sensor probe; 15—first magnetic suspension bearing actuator coil; 16—second magnetic suspension bearing actuator coil; 17—electromagnetic force suspension rotor; 18—power amplifier; 19—first sensor coil; 20—second sensor coil; 21—first end; 22—second end; 23—midpoint; 24—first capacitance probe; 25—second capacitance probe; 26—first resistor; 27—second resistor; 28—first connection point; 29—second connection point; 30—third connection point; 31—adjustable resistance; 32—capacitor; 33—buffer; 100—magnetic suspension bearing control system.

DETAILED DESCRIPTION

Embodiments of the present application will be described in detail below with reference to the accompanying drawings. The embodiments and features in the embodiments of the present disclosure may be randomly combined with each other if there is no conflict.

Steps shown in flowcharts of the drawings may be performed in a computer system such as a set of computer-executable instructions. Although a logical order is shown in a flowchart, in some certain cases, the steps shown or described may be performed in a different order from that herein.

A magnetic suspension bearing is an electromagnetic apparatus that uses a magnetic force to make a rotor suspend in a center of a stator, so as to obtain contactless support. An existing magnetic suspension bearing is composed of a displacement sensor, an actuator, a control system, an auxiliary bearing, and other parts. The displacement sensor is configured to collect a rotor displacement signal, and the magnetic suspension bearing is essentially a displacement control apparatus, so sensitivity and an accuracy of displacement collection are related to a suspension accuracy of the whole apparatus. The control system is used for achieving displacement control and resisting external disturbance. With rapid development of computer technologies, digital control has become a mainstream. The magnetic suspension bearing control system contains a displacement signal conversion circuit, a main operation unit, and a power amplification circuit, etc. The displacement signal conversion circuit contains a signal amplification circuit and a filtering circuit, etc., wherein the main operation unit carries out arithmetic operations, and the power amplification circuit mainly uses switch-type power amplification.

Some technologies have a technical problem that reduction of electromagnetic interference and improvement dynamic performance of a magnetic suspension bearing cannot be achieved at the same time. Based on this, the embodiments of the present application aim to provide a magnetic suspension bearing, a magnetic suspension bearing control system and method, thus contradiction between signal-to-noise ratio and dynamic response performance can be effectively solved.

For convenience of understanding the embodiments, firstly, a magnetic suspension bearing control system disclosed in an embodiment of the present application is described in detail.

Embodiment 1

FIG. 1 is a schematic diagram of a structure of a magnetic suspension bearing control system according to an embodiment of the present application, which includes a processor 1, a synchronous signal generation module 2, a displacement signal conversion circuit (composed of a first amplification circuit 11, a first sensor probe 13, and a second sensor probe 14 in FIG. 1), a post-processing circuit (composed of a rectification circuit 7, a filtering circuit 8, and a second amplification circuit 9), an A/D conversion module 10, a pulse width modulation module 4, and a frequency division circuit 3, a synchronization module 6, and a power amplifier 18. The above processor 1 is an abbreviation of a digital signal processor 1, and the post-processing circuit is an abbreviation of a sensor signal post-processing circuit. The power amplifier 18 may also be called a power device.

A connection relation among the above components is as follows: the processor 1, the synchronous signal generation module 2, the displacement signal conversion circuit, the post-processing circuit, and the A/D conversion module 10 are connected in a closed loop. The synchronous signal generation module 2, the frequency division circuit 3, the pulse width modulation module 4, and the power amplifier 18 are sequentially connected. The processor 1 is also connected with the pulse width modulation module 4. The pulse width modulation module 4, the synchronization module 6, and the A/D conversion module 10 are sequentially connected. The synchronization module 6 is also connected with the synchronous signal generation module 2 and the frequency division circuit 3 respectively.

Functions of the above components are as follows: the synchronous signal generation module 2 is configured to generate a reference signal and send the reference signal to the displacement signal conversion circuit and the frequency division circuit 3. The displacement signal conversion circuit is configured to convert the reference signal into an Alternating Current (AC) signal containing displacement information and send the AC signal containing the displacement information to the post-processing circuit. The post-processing circuit is configured to perform post-processing on the AC signal containing the displacement information to obtain a standard displacement signal, and send the standard displacement signal to the A/D conversion module 10. The frequency division circuit 3 is configured to perform frequency division on the reference signal to generate a frequency division signal and send the frequency division signal to the pulse width modulation module 4 and the synchronization module 6. The pulse width modulation module 4 is configured to output a Pulse Width Modulation (PWM) signal to the synchronization module 6. The synchronization module 6 is configured to determine delay time based on the PWM signal and sends a synchronization signal based on the delay time. The A/D conversion module 10 is configured to synchronize with the power amplifier 18 under an action of the synchronization signal, and convert the standard displacement signal into a standard displacement digital signal and send the standard displacement digital signal to the processor 1, so that the processor 1 may perform data processing on the standard displacement digital signal. A type of the reference signal may be either a sine wave or a square wave, which is not limited here. The AC signal containing the displacement information indicates a sensor modulation signal containing displacement information of an electromagnetic force suspension rotor 17 (or referred to as a current rotor) formed after the reference signal is amplified by the first amplification circuit 11 to drive the first sensor probe 13 and the second sensor probe 14.

The magnetic suspension bearing control system provided in the embodiment of the present application includes the synchronization module 6. The synchronization signal sent by the synchronization module 6 to the A/D conversion module 10 may effectively avoid interference of an impulse current and an impulse voltage caused by a device switch in the power amplifier 18, ensure a transient process of current and voltage fluctuation caused by the device switch to end, and ensure that the interference of the impulse current and the impulse voltage are avoided in a process of A/D conversion, thereby increasing a system response bandwidth, improving a response speed, and effectively solving the contradiction between the signal-to-noise ratio and the dynamic response performance.

In an exemplary embodiment, as shown in FIG. 1, a displacement signal conversion circuit includes a first amplification circuit 11 and a sensor which are connected with each other, and the first amplification circuit 11 is also connected with the synchronous signal generation module 2. The first amplification circuit 11 is configured to amplify a reference signal into an excitation signal. The sensor is driven by the excitation signal to generate an AC signal containing displacement information. Further, the sensor includes a first sensor probe 13 and a second sensor probe 14. The first sensor probe 13 and the second sensor probe 14 are disposed on upper and lower sides of an electromagnetic force suspension rotor 17. It should be noted that a purpose of a sensor is to generate the AC signal containing the displacement information. The upper and lower sides in this embodiment refer to a relative positional relationship, which is not specific. That is to say, although they are on the upper and lower sides of the electromagnetic force suspension rotor 17, they are not necessarily on the upper and lower sides in an actual system, but may be on left and right sides, front and rear sides, etc., as long as they are installed on two sides of a rotor with a relative angle of 180 degrees, so this embodiment is not limited thereto.

Figure 2:
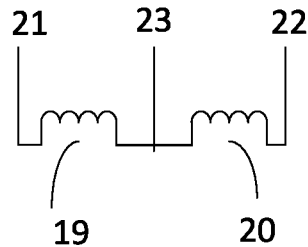
FIG. 2 is a schematic diagram of wirings of an inductive displacement sensor and an eddy-current displacement sensor in a technology.

In an exemplary embodiment, a sensor may refer to an inductive displacement sensor, an eddy-current displacement sensor, or a capacitive displacement sensor. There are similarities in structures of the inductive displacement sensor and the eddy-current displacement sensor, and they each include a first sensor coil 19, a second sensor coil 20, a first end 21, a second end 22, and a midpoint 23 located between the first end 21 and the second end 22 in FIG. 2. Herein, the first sensor probe 13 may refer to the first end 21, and the second sensor probe 14 may refer to the second end 22. Two ends (i.e., the first end 21 and the second end 22) of the first sensor coil 19 and the second sensor coil 20 connected in series receive excitation signals (or called AC excitation signals), and the midpoint 23 is connected to a sensor signal post-processing circuit. However, the inductive displacement sensor and the eddy-current displacement sensor are also different in structure. Differences are as follows: a coil of the inductive displacement sensor needs an iron core, and a detected surface on a corresponding rotor needs to be made of a magnetically permeable material. However, the eddy-current displacement sensor does not need an iron core, and a detected surface needs a conductive material.

Figure 3:
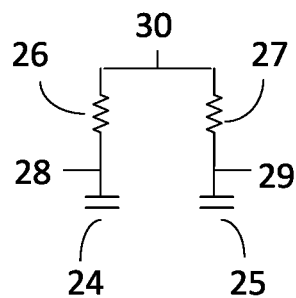
FIG. 3 is a schematic diagram of wirings of a capacitive displacement sensor in one technology.

The capacitive displacement sensor includes a first capacitance probe 24, a second capacitance probe 25, a first resistor 26, a second resistor 27, a first connection point 28, a second connection point 29, and a third connection point 30 in FIG. 3. The first connection point 28 is a connection point between the first capacitance probe 24 and the first resistor 26, and the second connection point 29 is a connection point between the second capacitance probe 25 and the second resistor 27. The third connection point 30 is a connection point between the first resistor 26 and the second resistor 27. In this embodiment, the first sensor probe 13 may refer to the first capacitance probe 24, and the second sensor probe 14 may refer to the second capacitance probe 25. As shown in FIG. 3, the first capacitance probe 24 and the second capacitance probe 25 are respectively connected with the first resistor 26 and the second resistor 27, the first connection point 28 and the second connection point 29 receive the AC excitation signals, and the third connection point 30 may be used as the midpoint to be connected with the sensor signal post-processing circuit.

In the embodiment of the present application, through the synchronization module 6 and a corresponding synchronization method, it is ensured that a power device is not in an on-off state at a sampling moment of a sensor, thus effectively solving a problem of interference to signal sampling.

In an exemplary embodiment, as shown in FIG. 1, the post-processing circuit includes a rectification circuit 7, a filtering circuit 8, and a second amplification circuit 9 which are sequentially connected. The connection midpoint 23 of the first sensor probe 13 and the second sensor probe 14 is connected with the rectification circuit 7. The second amplification circuit 9 is connected with the A/D conversion module 10. The rectification circuit 7 is configured to convert the AC signal containing the displacement information into a half-wave displacement signal containing displacement information under an action of a control signal. The filtering circuit 8 is configured to perform filtering based on the half-wave signal containing the displacement information to obtain a filtered displacement signal. The second amplification circuit 9 is configured to adjust the filtered displacement signal to obtain a standard displacement signal. The rectification circuit 7 may be called a synchronous rectification module or a controlled rectification circuit. The above-mentioned half-wave signal containing the displacement information may refer to an unfiltered sensor analog voltage signal.

The above filtering circuit 8 is a first-order low-pass filter or a second-order low-pass filter. Since the magnetic suspension bearing control system does not need to filter out a noise caused by a switching current/voltage in a coil, a low-pass filter with a lower order such as first-order or second-order may be used for the filtering circuit 8, and a filtering bandwidth may be set higher, which only needs to be less than half of a sampling frequency.

In an exemplary embodiment, as shown in FIG. 1, the magnetic suspension bearing control system further includes a delay adjustment circuit 12 disposed between the synchronous signal generation module 2 and the rectification circuit 7. The delay adjustment circuit 12 is configured to adjust the reference signal and determine an adjusted signal as the control signal. The delay adjustment circuit 12 may be referred to as a phase adjustment module.

Figure 4:
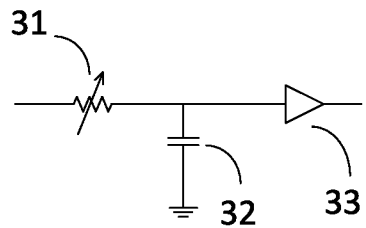
FIG. 4 is a schematic diagram of a structure of a delay adjustment circuit in one technology.

In an exemplary embodiment, as shown in FIG. 4, the delay adjustment circuit 12 includes an adjustable resistor 31, a capacitor 32, and a buffer 33 which are connected with each other. Delay time may be set by adjusting a resistance of the resistor 31, the capacitor 32 is grounded, and the buffer 33 is configured to output an adjusted signal. It should be noted that the structure of the delay adjustment circuit 12 given above is exemplary, and it may be another structure, that is, the structure of the delay adjustment circuit 12 is not limited in the embodiments of the present application.

In an exemplary embodiment, as shown in FIG. 1, the magnetic suspension bearing control system further includes an inverter 5 disposed between the pulse width modulation module 4 and the power amplifier 18. The inverter 5 is configured to drive a device switch in the power amplifier 18 based on a PWM signal. The device switch is a Metal-Oxide-Semiconductor Field-Effect Transistor (MOSFET) or an Insulated Gate Bipolar Transistor (IGBT).

Combined with connection relationships among components and functions of the magnetic suspension bearing control system given above, an embodiment of the present application discloses a magnetic suspension bearing control method, which is applied to a magnetic suspension bearing control system and implements following steps.

In step 110, a synchronous signal generation module 2 generates a reference signal of a sine wave or square wave type, wherein the reference signal is amplified by a first amplification circuit 11 into an excitation signal with a driving ability, which excites a first sensor probe 13 and a second sensor probe 14 to generate an Alternating Current (AC) signal containing displacement information, and a connection midpoint 23 of these two sensor probes is connected to a sensor signal post-processing circuit.

In step 120, post-processing is performed on the AC signal containing displacement information. The sensor signal post-processing circuit includes a rectification circuit 7, a filtering circuit 8, and a second amplifier circuit 9. A function of the rectification circuit 7 is to convert the AC signal containing the displacement information into a half-wave displacement signal containing the displacement information, wherein there is approximately a linear relationship between a signal amplitude and rotor displacement. A control signal of the rectification circuit 7 is derived from an adjusted signal obtained after the reference signal generated by the synchronous signal generation module 2 is adjusted by a delay adjustment circuit 12. A method of delay adjustment is to first determine signal transmission delay time T1 generated after the excitation signal passes through the first sensor probe 13 and the second sensor probe 14, and to make delay time equal to the above T1 by adjusting an adjustable resistor 31 in the delay adjustment circuit 12, so that an output of the delay adjustment circuit 12 is a neat half wave, that is, the adjusted signal is a neat half wave.

A function of the filtering circuit 8 is mainly to filter out a high-frequency signal with a same frequency as a carrier signal, eliminate a high-frequency noise that may exist in a circuit, and prevent a phenomenon of A/D sampling aliasing during operation of an A/D conversion module 10. A function of the second amplification circuit 9 is to adjust a voltage signal linearly related to the rotor displacement (i.e., the above-mentioned filtered displacement signal) to a signal adapted to an input voltage range of the A/D conversion module 10 (i.e., the above-mentioned standard displacement signal), so as to make full use of an analog voltage range of A/D sampling.

In step 130, the reference signal generated by the synchronous signal generation module 2 is subjected to frequency division by N using a frequency division circuit 3, wherein N may be an integer greater than or equal to 1. According to differences of PWM duty ratios output by a pulse width modulation (PWM) module 4, a synchronization module 6 determines an output moment based on a frequency division signal or a PWM signal to output a synchronization signal, it may output the synchronization signal to trigger an A/D conversion module 10 to perform AD conversion under different conditions. For example, when the PWM duty ratio output by the PWM module 4 is 0 or 100%, the synchronization module 6 outputs a triggering signal (i.e., the above-mentioned synchronization signal) at a rising edge or a falling edge of the frequency division signal output by the frequency division circuit 3. When the PWM duty ratio output by the PWM module 4 is close to 0, the synchronization module 6 outputs a triggering signal after a falling edge of the PWM signal is delayed by T2. A determination basis for the duty ratio being close to 0 is that high level time of the PWM signal is less than or equal to T2. When the PWM duty ratio output by the PWM module 4 is close to 100%, the synchronization module 6 outputs a triggering signal after a rising edge of a PWM signal is delayed by T3. A determination basis for the duty ratio being close to 100% is that low level time of the PWM signal is less than or equal to T3. T2 is determined by measuring turn-off transition time of a Metal-Oxide-Semiconductor Field-Effect Transistor (MOSFET) or an Insulated Gate Bipolar Transistor (IGBT) inside a power amplifier 18 through experiments, and T2 is set to a value greater than the turn-off transition time. T3 is determined by measuring turn-on transition time of a MOSFET or an IGBT inside the power amplifier 18 through experiments, and T3 is set to a value greater than the turn-on transition time. When a PWM duty ratio is neither close to 0 nor close to 100%, a triggering signal may be output after a rising edge of the PWM signal is delayed by T3 or may be output after a falling edge of the PWM signal is delayed by T2.

An adjustment goal of the synchronization module 6 is to make a delay slightly longer than switching time of the power amplifier 18 to avoid switching interference of a power device. In addition to adjustment of the delay time, the synchronization module 6 may also perform differentiated processing according to different situations of the PWM. Therefore, through the above operations of the synchronization module 6, interference of an impulse current and an impulse voltage caused by a device switch in the power amplifier 18 may be effectively avoided, and a transient process of current and voltage fluctuations caused by the device switch in the power amplifier 18 may be ensured to be ended, thereby avoiding interference of an impulse current and an impulse voltage during AD conversion.

The triggering signal output by the synchronization module 6 triggers the A/D conversion module 10 to perform A/D conversion on the standard displacement signal. After the conversion is completed, the processor 1 is notified through interruption to read data and start algorithm operations. A control algorithm adopted by the processor 1 may be a Proportion-Integral-Differential (PID) algorithm or another modern control algorithm.

In step 140, the processor 1 outputs an operation result (i.e., a numerical value of a control current, which ranges from 0 to a maximum current) to the pulse width modulation module 4 for generating a PWM signal, after being inverted by an inverter 5, a complementary pair of PWM signals are generated to drive a device switch of a MOSFIT or an IGBT in the power amplifier 18 to generate a control current to enter a pair of differential magnetic suspension bearing actuator coils, thereby generating an electromagnetic force to act on an electromagnetic force suspension rotor 17 to achieve suspension control.

An embodiment of the present application provides a magnetic suspension bearing control system. After A/D conversion is performed by an A/D conversion module 10, a processor 1 collects a displacement signal (i.e., the above-mentioned standard displacement digital signal) of a current rotor, performs calculations of a control algorithm to obtain a numerical value of a control current. A synchronous signal generation module 2 generates a synchronous reference signal of a sine wave or square wave type. A frequency division circuit 3 performs frequency division on the reference signal. A delay adjustment circuit 12 adjusts a phase of the reference signal. One or more rectification circuits 7 may achieve rectification of a sensor modulation signal, and a pulse width modulation module 4 generates a PWM signal.

A process of generating the PWM signal may be as follows: the pulse width modulation module 4 generates a PWM signal with a corresponding duty ratio based on a percentage of the control current output by the processor 1. In an exemplary embodiment, this control has two closed loops, an inner loop is a current loop, and functions achieved are to make currents of control coils of a first magnetic suspension bearing actuator coil 15 and a second magnetic suspension bearing actuator coil 16 reach given values. Current signals of the two coils are collected, and the processor 1 outputs a signal of 0 to 100% to a pulse width modulation module 4 according to a feedback law. The pulse width modulation module 4 generates a PWM signal with a duty ratio of 0 to 100%. An outer ring is a displacement ring, and its functions are to make a displacement of a current rotor reach a given value, collect a signal of a displacement sensor, and an output result is a percentage of a current, which is sent to the inner ring. A design of an inner loop is not shown in FIG. 1, and the above current signals of the two coils are not introduced into the A/D conversion module 10.

An A/D conversion module 10 with conversion trigger converts an analog voltage signal of a sensor after being filtered and amplified into a digital signal (i.e., the above-mentioned standard displacement digital signal), and a synchronization module 6 may achieve synchronization of Analog-to-Digital conversion and a power device switch. Through synchronization of these above-mentioned modules, synchronization of an excitation signal of the sensor, a triggering signal of the A/D conversion module 10, and a switching signal of the power amplifier 18 may be achieved to reduce interference.

A premise of the synchronization of these modules is presence of a reference signal, synchronization of the excitation signal of the sensor and the switching signal of the power amplifier 18 and all modules work based on this reference signal. Signal sampling and device switch control are completed in one synchronous period (a period after frequency division). The synchronization module 6 ensures that a sampling process of the sensor is not interfered by a device switch under a premise of one synchronous period. In this embodiment, the most important thing is to achieve synchronization between the A/D conversion module 10 and the pulse width modulation module 4, and the synchronization module 6 is a key module for achieving synchronization.

The first amplifier circuit 11 amplifies the reference signal into an excitation signal with a driving ability, the filtering circuit 8 filters out high frequency interference, the second amplifier circuit 9 amplifies a signal to a voltage signal adapted to an input range of an analog amount of an AD collection chip, the inverter 5 is configured to generate an inverted PWM signal, the power amplifier 18 converts a PWM signal into a corresponding current signal, the first sensor probe 13 and the second sensor probe 14 detect a rotor displacement of a current rotor, and the first magnetic suspension bearing actuator coil 15 and the second magnetic suspension bearing actuator coil 16 are energized to generate an electromagnetic force to suspend the electromagnetic force suspension rotor 17.

In an exemplary embodiment, the reference signal output by the synchronous signal generation module 2 may be generated by a hardware circuit, or may be generated by a timer of the processor 1 and then output through an IO pin. When generated by the hardware circuit, the reference signal is connected to an external interrupt pin of the processor 1 for program synchronization.

A most important feature (i.e., a key point) of the embodiment of the present application is that the excitation signal of the sensor, the triggering signal of the A/D conversion module 10, and the switching signal of the power amplifier 18 all share one signal source, which may ensure through internal synchronization that a signal collection moment (i.e., an output moment of a post-processing circuit) is not interfered by a power device switch, thereby increasing a system response bandwidth, improving a response speed, and effectively solving a contradiction between a signal-to-noise ratio and dynamic response performance.

Embodiment 2

Figure 5:
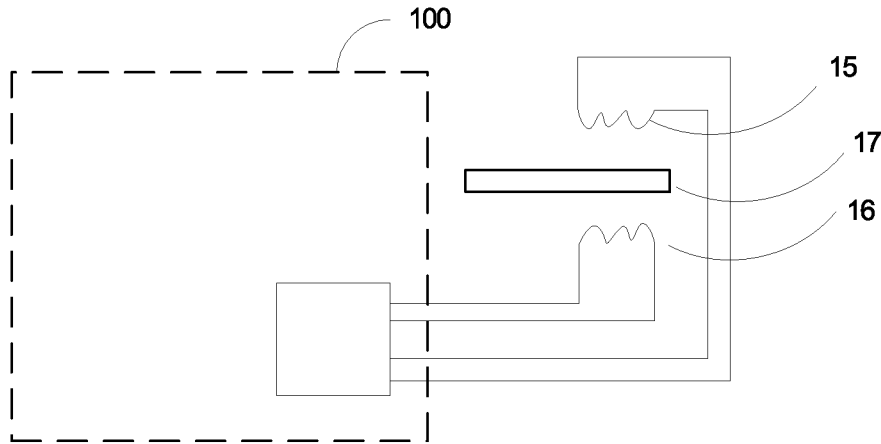
FIG. 5 is a schematic diagram of a structure of a magnetic suspension bearing according to an embodiment of the present application.

FIG. 5 is a schematic diagram of a structure of a magnetic suspension bearing according to an embodiment of the present application. The magnetic suspension bearing according to this embodiment includes the magnetic suspension bearing control system 100 described in Embodiment 1, a first iron core (not shown in FIG. 5), a first magnetic suspension bearing actuator coil 15 wound around the first iron core, a second iron core, a second magnetic suspension bearing actuator coil 16 wound around the second iron core, and an electromagnetic force suspension rotor 17. The first magnetic suspension bearing actuator coil 15 and the second magnetic suspension bearing actuator coil 16 are disposed on upper and lower sides of the electromagnetic force suspension rotor 17 in parallel, and the first magnetic suspension bearing actuator coil 15 and the second magnetic suspension bearing actuator coil 16 are both connected with the magnetic suspension bearing control system 100. Both the first iron core and the second iron core may be made of silicon steel sheets, and materials of the first iron core and the second iron core are not limited in this embodiment.

An inverter 5, a rectification circuit 7, a filtering circuit 8, a second amplifier circuit 9, a delay adjustment circuit 12, a first sensor probe 13, a second sensor probe 14, a first magnetic suspension bearing actuator coil 15, a second magnetic suspension bearing actuator coil 16, an electromagnetic force suspension rotor 17, and a power amplifier 18 in the magnetic suspension bearing control system 100 may represent a magnetic suspension bearing with one degree of freedom, and an actual magnetic suspension bearing may have multiple degrees of freedom. These modules are juxtaposed in a case that there are multiple degrees of freedom, and a common magnetic suspension bearing with five degrees of freedom has five paths of same components. The embodiment of the present application focuses on a synchronization method, and a principle is the same no matter how many degrees of freedom there are.

After the inverter 5 in the magnetic suspension bearing control system 100 drives a device switch, the power amplifier 18 generates a control current and applies the control current to the first magnetic suspension bearing actuator coil 15 and the second magnetic suspension bearing actuator coil 16. An electromagnetic force generated by the first magnetic suspension bearing actuator coil 15 and the second magnetic suspension bearing actuator coil 16 acts on the electromagnetic force suspension rotor 17, so that the electromagnetic force suspension rotor 17 achieves suspension control.

As there is a switching device (i.e., the device switch) MOSFET or IGBT in the power amplifier 18, phenomenon such as voltage shock, parasitic oscillation, and ringing will occur during a transition process of a switch, which will all cause interference to a peripheral circuit. When the transition process is over, the interference disappears. A purpose of the embodiment of the present application is to ensure, by synchronization that every time a signal is collected, it is a moment when a transition process has ended.

In an embodiment of the present application, the low-pass filter may be omitted or a low-pass filter with a higher cut-off frequency may be used, which may significantly reduce phase lag of an unidirectional displacement signal caused by filtering, improve a dynamic response capability of the magnetic suspension bearing, at the same time effectively avoid interference caused by a switch of the power amplifier 18, reduce a control noise, and improve a control stability of the magnetic suspension bearing. Since the magnetic suspension bearing includes the magnetic suspension bearing control system 100, and the magnetic suspension bearing control system 100 includes the synchronization module 6, beneficial effects brought by the synchronization module 6 are also applicable to the magnetic suspension bearing, so this embodiment may bring about same technical effects as those of the previous embodiments, which will not be repeated here.

Embodiment 3

Figure 6:
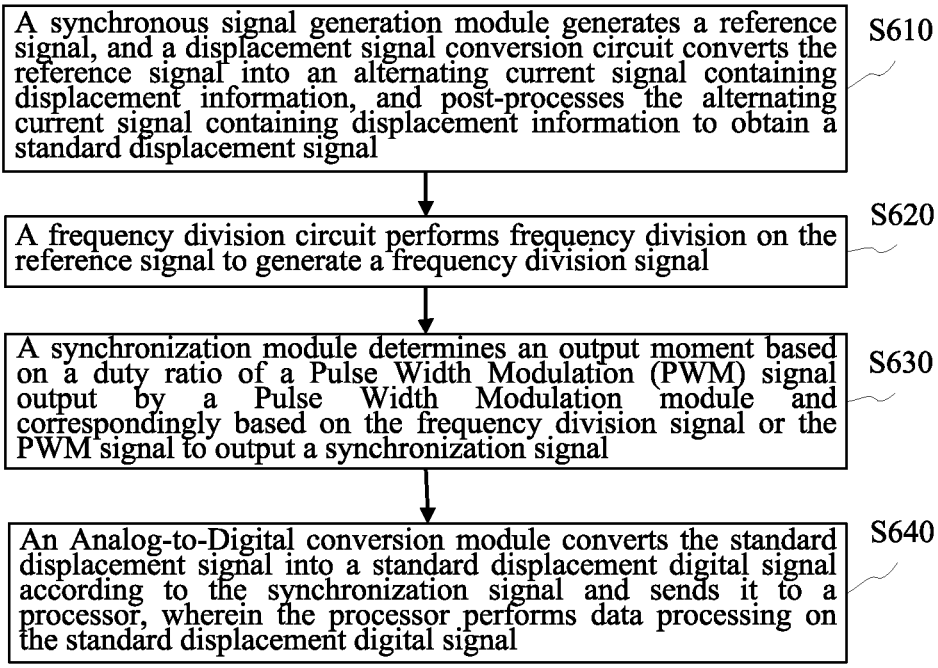
FIG. 6 is a flowchart of a magnetic suspension bearing control method according to an embodiment of the present application.

FIG. 6 is a flowchart of a magnetic suspension bearing control method according to an embodiment of the present application. The magnetic suspension bearing control method according to this embodiment is applied to the magnetic suspension bearing control system described in any one of the above embodiments, and includes steps S610-S640.

In step S610, a synchronous signal generation module generates a reference signal, and a displacement signal conversion circuit converts the reference signal into an alternating current signal containing displacement information, and performs post-processing on the alternating current signal to obtain a standard displacement signal.

In step S620, a frequency division circuit performs frequency division on the reference signal to generate a frequency division signal.

In step S630, a synchronization module determines an output moment based on a duty ratio of a Pulse Width Modulation (PWM) signal output by a pulse width modulation module and correspondingly based on the frequency division signal or the PWM signal to output a synchronization signal.

In step S640, an Analog-to-Digital (A/D) conversion module converts the standard displacement signal into a standard displacement digital signal according to the synchronization signal and sends the standard displacement digital signal to a processor, so that the processor may perform data processing on the standard displacement digital signal.

In an exemplary embodiment, the step of the displacement signal conversion circuit converting the reference signal into the alternating current signal containing the displacement information and performing post-processing on the alternating current signal to obtain the standard displacement signal includes:

a rectification circuit converts the reference signal into a half-wave signal containing the displacement information under an action of a control signal;

a filtering circuit filters the half-wave signal containing the displacement information to obtain a filtered displacement signal; and a second amplification circuit adjusts the filtered displacement signal to obtain the standard displacement signal.

The magnetic suspension bearing control method according to the embodiment of the present application is applied to the magnetic suspension bearing control system described in any of the above embodiments, therefore this embodiment may bring about the same technical effects as those in the above embodiments, which will not be repeated here.

Those skilled in the art may clearly understand that for convenience and conciseness of description, a working process of the magnetic suspension bearing described above may refer to a corresponding process in the aforementioned Embodiment 1, which will not be repeated here.

In addition, in the description of the embodiments of the present application, unless otherwise specified and limited, terms "installed", "connected", and "connection" should be understood in a broad sense. For example, it may be a fixed connection, a detachable connection, or an integrated connection; it may be a mechanical connection or an electrical connection; it may be a direct connection, an indirect connection through an intermediate medium, or inner communication between two elements. For those of ordinary skills in the art, meanings of the above terms in the embodiments of the present application may be understood according to an actual situation.

In the description of the embodiments, it should be noted that an orientation or a positional relationship indicated by terms "middle", "upper", "lower", "inner", and "outer" are based on an orientation or a positional relationship shown in the drawings, which is only for convenience of describing the embodiments of the present application and simplifying the description, but do not indicate or imply that a referred apparatus or element must have a specific orientation, be constructed and operated in a specific orientation, so it cannot be understood as a limitation to the embodiments. In addition, terms "first" and "second" are used for descriptive purposes only and cannot be understood as indicating or implying relative importance.

It may be understood by those of ordinary skills in the art that all or some of the steps in the methods disclosed above, functional modules/units in the systems and apparatuses disclosed above may be implemented as a software, a firmware, a hardware, and an appropriate combination thereof. In a hardware implementation mode, a division between functional modules/units mentioned in the above description does not necessarily correspond to a division of physical components; for example, a physical component may have multiple functions, or a function or step may be cooperatively performed by several physical components. Some or all of the components may be implemented as software executed by a processor, such as a Digital Signal Processor or a microprocessor, or as hardware, or as an integrated circuit, such as an Application Specific Integrated Circuit. Such software may be distributed on a computer-readable medium, which may include a computer storage medium (or a non-transitory medium) and a communication medium (or a transitory medium). As well known to those of ordinary skills in the art, the term computer storage medium includes a volatile, nonvolatile, removable, and non-removable medium implemented in any method or technology for storing information (such as computer readable instructions, a data structure, a program module, or other data). A computer storage medium includes but is not limited to a Random Access Memory (RAM), a Read Only Memory (ROM), an Electrically Erasable Programmable Read-Only Memory (EEPROM), a flash memory, or another memory technology, a CD-ROM, a Digital Versatile Disk (DVD), or another optical disk storage, a magnetic box, a magnetic tape, a magnetic disk storage, or another magnetic storage apparatus, or any other medium that may be configured to store desired information and may be accessed by a computer. Furthermore, it is well known to those of ordinary skills in the art that a communication medium generally contains computer readable instructions, a data structure, a program module, or other data in a modulated data signal such as a carrier wave or another transmission mechanism, and may include any information delivery medium.

What is claimed is:

1. A magnetic suspension bearing control system, comprising: a processor, a synchronous signal generation module, a displacement signal conversion circuit, a post-processing circuit, an Analog-to-Digital conversion module, a pulse width modulation (PWM) module, a frequency division circuit, a synchronization module, and a power amplifier;

wherein the processor, the synchronous signal generation module, the displacement signal conversion circuit, the post-processing circuit, and the Analog-to-Digital conversion module are connected in a closed loop; the synchronous signal generation module, the frequency division circuit, the pulse width modulation module, and the power amplifier are sequentially connected; the processor is further connected with the pulse width modulation module; the pulse width modulation module, the synchronization module, and the Analog-to- Digital conversion module are sequentially connected; the synchronization module is further respectively connected with the synchronous signal generation module and the frequency division circuit;

the synchronous signal generation module is configured to generate a reference signal and send the reference signal to the displacement signal conversion circuit and the frequency division circuit;

the displacement signal conversion circuit is configured to convert the reference signal into an alternating current signal containing displacement information and send the alternating current signal containing the displacement information to the post-processing circuit;

the post-processing circuit is configured to perform post-processing on the alternating current signal containing the displacement information to obtain a standard displacement signal, and send the standard displacement signal to the Analog-to-Digital conversion module;

the frequency division circuit is configured to perform frequency division on the reference signal to generate a frequency division signal and send the frequency division signal to the pulse width modulation module and the synchronization module;

the pulse width modulation module is configured to output a Pulse Width Modulation (PWM) signal to the synchronization module;

the synchronization module is configured to receive the PWM signal from the pulse width modulation module, determine delay time based on a duty ratio of the PWM signal and correspondingly based on the frequency division signal or the PWM signal, and send a synchronization signal based on the delay time to the Analog-to-Digital conversion module, wherein a duration of the delay time is set to be slightly longer than a duration of switching time of the power amplifier, such that during a subsequent Analog-to-Digital conversion, interference of an impulse current and an impulse voltage caused by a device switch in the power amplifier is avoided; and the Analog-to-Digital conversion module is configured to synchronize with the power amplifier under an action of the synchronization signal, and convert the standard displacement signal into a standard displacement digital signal and send the standard displacement digital signal to the processor, wherein the processor performs data processing on the standard displacement digital signal.

2. The system according to claim 1, wherein the displacement signal conversion circuit comprises a first amplification circuit and a sensor which are connected with each other, and the first amplification circuit is further connected with the synchronous signal generation module;

the first amplification circuit is configured to amplify the reference signal into an excitation signal; and the sensor is configured to be driven by the excitation signal to generate the alternating current signal containing the displacement information.

3. The system according to claim 2, wherein the sensor comprises a first sensor probe and a second sensor probe; the first sensor probe and the second sensor probe are respectively disposed on upper and lower sides of an electromagnetic force suspension rotor.

4. The system according to claim 3, wherein the post-processing circuit comprises a rectification circuit, a filtering circuit, and a second amplification circuit which are sequentially connected; a connection midpoint of the first sensor probe and the second sensor probe is connected with the rectification circuit; the second amplification circuit is connected with the Analog-to-Digital conversion module;

the rectification circuit is configured to convert the alternating current signal containing the displacement information into a half-wave signal containing the displacement information under an action of a control signal;

the filtering circuit is configured to perform filtering based on the half-wave signal containing the displacement information to obtain a filtered displacement signal; and the second amplification circuit is configured to adjust the filtered displacement signal to obtain the standard displacement signal.

5. The system according to claim 4, further comprising: a delay adjustment circuit disposed between the synchronous signal generation module and the rectification circuit; and the delay adjustment circuit is configured to adjust the reference signal and determine an adjusted signal as the control signal.

6. The system according to claim 5, wherein the delay adjustment circuit comprises an adjustable resistor, a capacitor, and a buffer which are connected with each other.

7. The system according to claim 1, further comprising: an inverter disposed between the pulse width modulation module and the power amplifier; and the inverter is configured to drive the device switch in the power amplifier based on the PWM signal.

8. The system according to claim 2, wherein the sensor is an inductive displacement sensor, an eddy-current displacement sensor, or a capacitive displacement sensor.

9. The system according to claim 4, wherein the filtering circuit is a first-order low-pass filter or a second-order low-pass filter.

10. A magnetic suspension bearing, comprising: the magnetic suspension bearing control system according to claim 1, a first iron core, a first magnetic suspension bearing actuator coil wound on the first iron core, a second iron core, a second magnetic suspension bearing actuator coil wound on the second iron core, and an electromagnetic force suspension rotor; wherein the first magnetic suspension bearing actuator coil and the second magnetic suspension bearing actuator coil are oppositely disposed on upper and lower sides of the electromagnetic force suspension rotor, and both the first magnetic suspension bearing actuator coil and the second magnetic suspension bearing actuator coil are connected with the magnetic suspension bearing control system.

11. A magnetic suspension bearing control method, applied to the magnetic suspension bearing control system according to claim 1, the method comprising:

generating, by the synchronous signal generation module, the reference signal, and converting, by the displacement signal conversion circuit, the reference signal into the alternating current signal containing the displacement information, and post-processing the alternating current signal containing the displacement information to obtain the standard displacement signal;

performing, by the frequency division circuit, frequency division on the reference signal to generate the frequency division signal;

determining, by the synchronization module, an output moment based on the duty ratio of the PWM signal output by the pulse width modulation module and correspondingly based on the frequency division signal or the PWM signal to output the synchronization signal; and converting, by the Analog-to-Digital conversion module, the standard displacement signal into the standard displacement digital signal according to the synchronization signal and sending the standard displacement digital signal to the processor, so that the processor performs data processing on the standard displacement digital signal.

12. The method according to claim 11, wherein converting the reference signal into the alternating current signal containing the displacement information by the displacement signal conversion circuit, and post-processing the alternating current signal containing the displacement information to obtain the standard displacement signal comprises:
  converting, by a rectification circuit, the reference signal into a half-wave signal containing the displacement information under an action of a control signal;
  filtering, by a filtering circuit, the half-wave signal containing the displacement information to obtain a filtered displacement signal; and
  adjusting, by a second amplification circuit, the filtered displacement signal to obtain a standard displacement signal.

\* \* \* \* \*